United States Patent
Lee (10) Patent No.: US 7,128,297 B2
(45) Date of Patent: Oct. 31, 2006

(54) IMAGING DEVICE HAVING STAND CONNECTION

(75) Inventor: Eun-kyung Lee, Seongnam-si (KR)

(73) Assignee: Samsung Techwin Co., Ltd. (KR)

( * ) Notice: Subject to any disclaimer, the term of this patent is extended or adjusted under 35 U.S.C. 154(b) by 65 days.

(21) Appl. No.: 11/074,158

(22) Filed: Mar. 7, 2005

(65) Prior Publication Data

US 2006/0091268 A1 May 4, 2006

(30) Foreign Application Priority Data

Nov. 4, 2004 (KR) ............. 10-2004-0089206

(51) Int. Cl.
*A47B 91/00* (2006.01)

(52) U.S. Cl. .................. 248/187.1; 348/207.11; 396/419

(58) Field of Classification Search .......... 248/187.1, 248/177.1, 694; 396/419; 348/207.11, 211.1, 348/211.2, 211.4

See application file for complete search history.

(56) References Cited

U.S. PATENT DOCUMENTS

| | | | | |
|---|---|---|---|---|
| 4,570,887 A | * | 2/1986 | Banister | 248/187.1 |
| 6,196,504 B1 | * | 3/2001 | Lemke | 248/187.1 |
| 6,769,824 B1 | * | 8/2004 | Nakatani | 396/419 |

* cited by examiner

*Primary Examiner*—Ramon O Ramirez
(74) *Attorney, Agent, or Firm*—St. Onge Steward Johnston & Reens LLC (57) ABSTRACT

Provided is an imaging device having a stand connector that can assume an open position for allowing connection with a stand or tripod and a closed position when not coupled with the stand. The stand connector of the imaging device includes a connector body including a hollow cavity and a female screw capable of coupling with a corresponding male screw of the stand, an insert received in the cavity of the connector body and moveable between an open position allowing coupling of the stand by screwing the screws of the connector body and the stand and a closed position substantially covering an open end of the cavity in the connector body when not coupling with the stand, and biasing means configured to bias the insert to the closed position.

11 Claims, 8 Drawing Sheets

IMAGING DEVICE HAVING STAND CONNECTION

BACKGROUND OF THE INVENTION

This application claims priority of Korean Patent Application No. 10-2004-0089206, filed on Nov. 4, 2004, in the Korean Intellectual Property Office, the disclosure of which is incorporated herein in its entirety by reference.

FIELD OF THE INVENTION

The present invention relates to an imaging device having a connection structure for coupling with a stand (e.g., a tripod), and more particularly, to an imaging device having a stand connection structure which can assume a closed configuration when the stand is not coupled to the imaging device.

DESCRIPTION OF THE RELATED ART

In general, to capture a still image or a moving image of an object accurately and stably, imaging devices such as cameras and camcorders are affixed on a tripod for standing on the ground such that the imaging devices can be placed without movement during shooting for taking an object image with the imaging devices.

Figure 1:
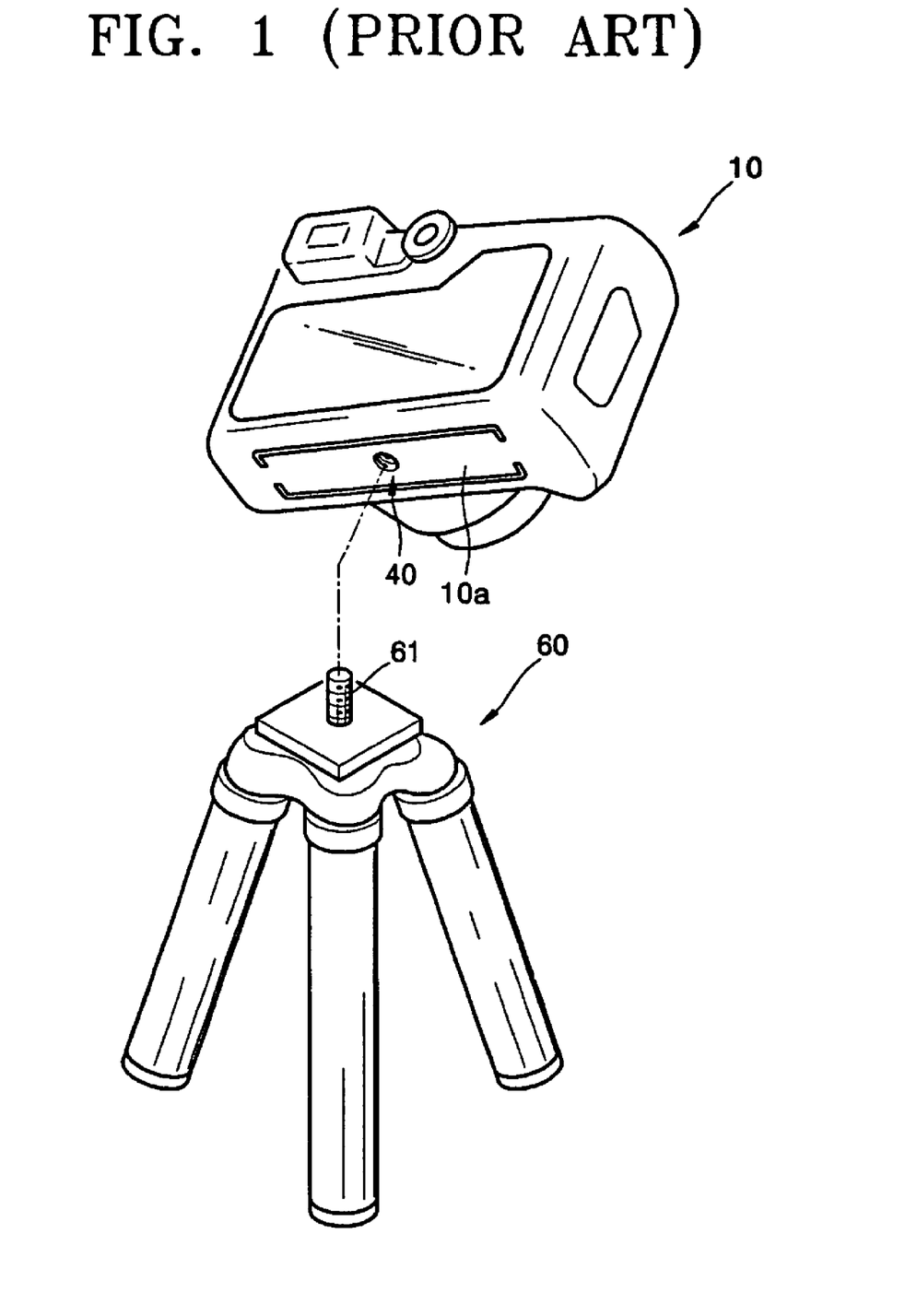
FIG. 1 is a perspective view illustrating a state for coupling a camera of conventional type to a tripod.

FIG. 1 is a perspective view illustrating a state for coupling a conventional camera to a tripod. Referring to FIG. 1, a connector 40 is formed at around the center in bottom surface 10a of a camera 10 for coupling with a fixing bolt 61 of a tripod 60. In particular, a female screw is formed in the connector 40, and the fixing bolt 61 of the tripod 60 engages with the female screw of the connector 40 for mounting the camera 10 on the tripod 60. In this structure, the connector 40 seeing from the out surface of the camera 10 may cause bad effects on the appearance of the camera 10. In addition, foreign substances may be introduced into the camera 10 through the screw hole of the connector 40, thereby causing poor coupling between the camera 10 and the tripod 60.

Mobile phones were used typically for telephonic communication. Recently, modern mobile phones were developed to incorporate various functions, such as that of an imaging device including a camera or a camcorder, which enables taking of a still or motion image with the mobile phones. However, compact imaging devices such as mobile phones and small cameras often have a narrow bottom surface, making it difficult to form therein a suitable connector (such as connector 40 as in FIG. 1) for coupling a tripod because of the space limitations. When the imaging devices are used for shooting without fixing to the tripod, the imaging device (e.g., a mobile phone) may shake during shooting, leading to obtain a bad or blurred image. More serious results can be caused if the imaging device is held by hand for a long period of time to take a video or to take a self-photograph, for example.

SUMMARY OF THE INVENTION

The present invention provides an imaging device having a stand connecting structure that can assume a closed configuration when a stand is not coupled to the imaging device, and an open configuration when coupling with the stand. This can provide a better appearance and ensure easy and secured photographing.

According to one aspect of the present invention, an imaging device comprises a stand connector for coupling with a stand to take an object image with the imaging device coupled with the stand, wherein the stand connector includes a connector body having a hollow cavity and a connection element capable of coupling with a corresponding connection element of the stand, a movable member disposed adjacent to the cavity of the connector body and moveable between an open position allowing coupling of the stand with the connection element and a closed position covering an open end of the cavity in the connector body, and biasing means configured to bias the moveable member to the closed position.

The moveable member is preferably an insert received in the cavity of the connector body and configured to stop at the closed position by the biasing force of the biasing means. The insert preferably has a stopper element opposing against a stepped portion of the connector body at the closed position. The connection element of the stand connector may be in form of a female screw capable of coupling with corresponding male screw of the stand while the insert moves to the open position by pressing of the male screw of the stand. The stand is preferably in form of a tripod known in the art.

The imaging device can be a digital camera having a main body and a folder member pivotally coupled by a hinge member, in which the stand connector is arranged at the hinge member of the digital camera. The imaging device can be a mobile phone capable of taking an image, the mobile phone having a main body and a folder member pivotally coupled by a hinge member, in which the stand connector is arranged at the hinge member of the mobile phone. The imaging device can be a camera in which the stand connector is formed on a bottom surface of the camera.

According to another aspect of the present invention, a stand connector of an imaging device usable for coupling the imaging device with a stand, comprises: a connector body including a hollow cavity and a female screw capable of coupling with a corresponding male screw of the stand; an insert received in the cavity of the connector body and moveable between an open position allowing coupling of the stand by screwing the screws of the connector body and the stand, and a closed position substantially covering an open end of the cavity in the connector body when not coupling with the stand; and biasing means configured to bias the insert to the closed position.

BRIEF DESCRIPTION OF DRAWINGS

The above and other features and advantages of the present invention will become more apparent by describing in detail exemplary embodiments thereof with reference to the attached drawings in which.

DETAILED DESCRIPTION OF PREFERRED EMBODIMENTS

The present invention will now be described more in details with reference to the accompanying drawings, in which preferred embodiments of the invention are shown.

Figure 2:
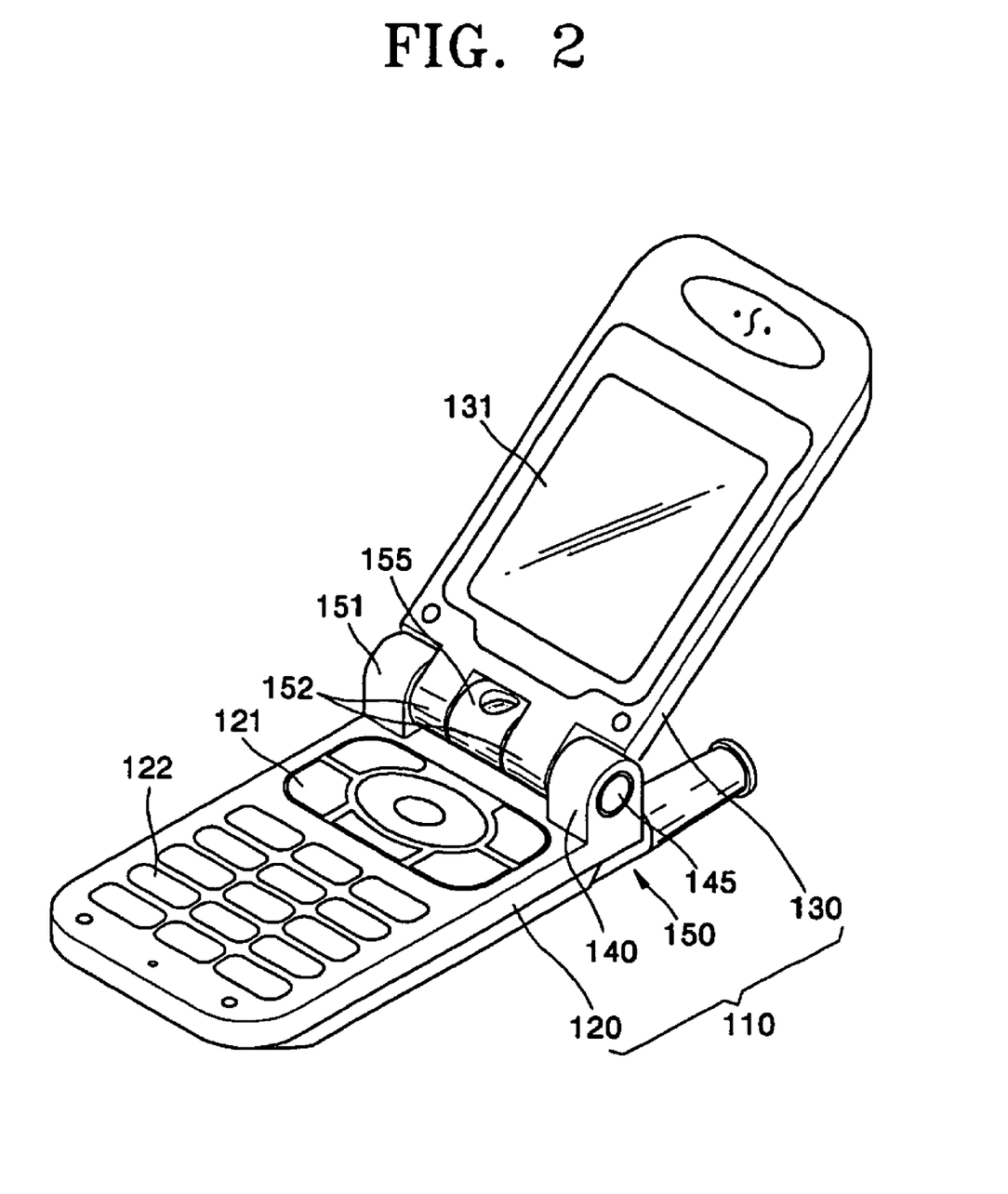
FIG. 2 is a perspective view of a mobile phone constructed according to one embodiment of the present invention.

FIG. 2 is a perspective view of an imaging device such as a folder-type mobile phone 110 constructed according to one embodiment of the present invention. The mobile phone 110 includes a main body 120 and a folder cover 130. The main body 120 and the folder cover 130 are connected by a hinge member 150 such that the folder cover 130 rotates about the hinge member 150 to open and close relative to the main body 120.

The folder cover 130 includes a display panel 131 on which information stored in the mobile phone 110 or other pertinent information is displayed, and the main body 120 includes navigation keys 121 and alphanumeric keypads 122 for user entry of information and selection of modes, and the like.

Figure 3:
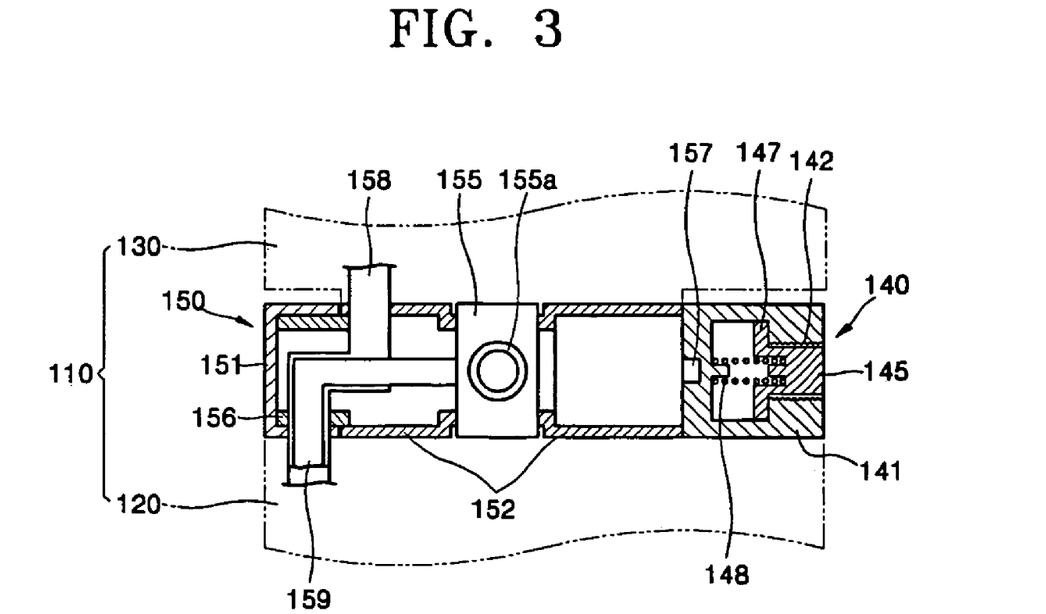
FIG. 3 is a schematic sectional view of a hinge member of the mobile phone shown in FIG. 2.

The hinge member 150 includes folder coupling parts 152 formed on a lower end of the folder cover 130, and a body coupling parts 151 extending from an upper surface of the main body 120 for rotatably coupling with the folder coupling parts 152. As shown in FIGS. 2 and 3, one of the body coupling parts 151 is preferably in the form of a stand connector 140 which includes a mounting structure for attaching to a stand such as a tripod. The stand connector 140 may replace one body coupling part 151 as shown, or alternatively, it may be coupled with one of the two body coupling parts 151 in any suitable manner recognizable. The stand connector 140 may also be disposed at any desired location of the imaging device other than at the body coupling parts 151.

FIG. 3 is a schematic and sectional-in-part view of the hinge member of the mobile phone shown in FIG. 2. Referring to FIG. 3, left one of the folder coupling parts 152 is rotatably coupled to the body coupling part 151 through a connecting member 156 and the other one of the folder coupling parts 152 is rotatably coupled to the stand connector 140 through a shaft 157.

A flexible printed circuit 158 for panel and a flexible printed circuit 159 for camera are disposed at the hinge member 150 of the mobile phone 110. The flexible printed circuit 158 for panel applies a driving signal produced from a circuit board of the main body 120 to the display panel 131 (see FIG. 2) to display various information on the display panel 131. The flexible printed circuit 159 for camera electrically connects a camera module 155 and the circuit board of the main body 120 to transfer an image signal obtained from the camera module 155 to the main body 120 or transfer power and the driving signal obtained from the main body 120 to the camera module 155.

In the mobile phone 110 shown in FIGS. 2 and 3, while the camera module 155 is mounted on the hinge member 150, it may be mounted on the folder cover 130 or on the main body 120. Reference numeral 155a denotes a lens of the camera module 155.

Figure 4:
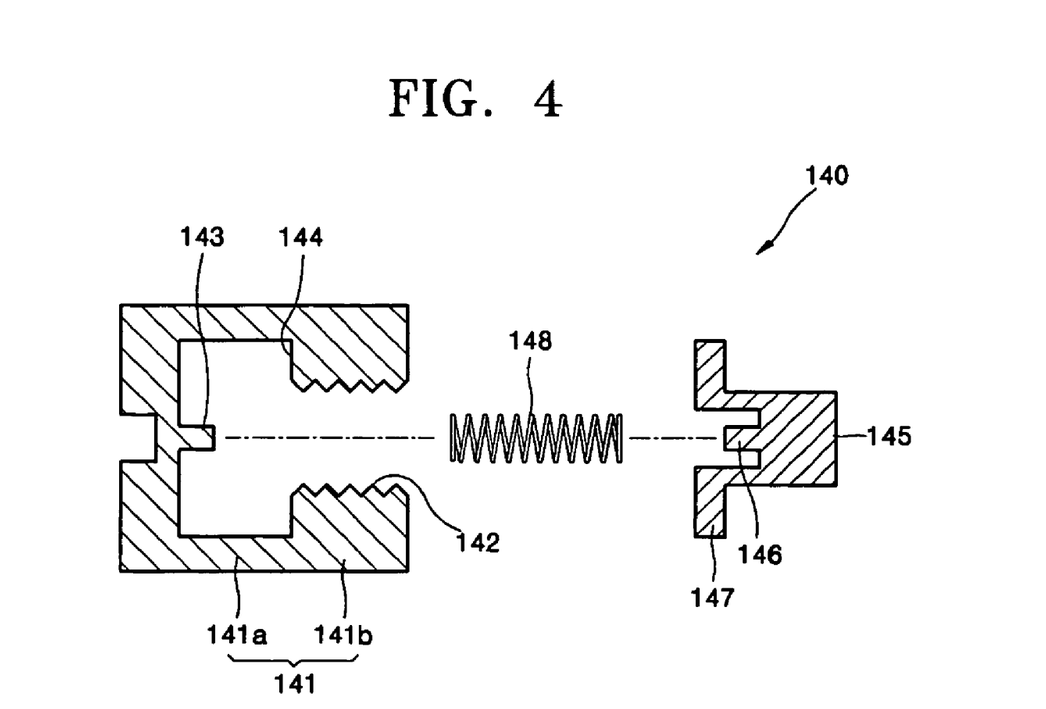
FIG. 4 is a development view of a stand connector of the hinge member shown in FIG. 3.

FIG. 4 is a development view of the stand connector 140 shown in FIG. 3. The stand connector 140 includes a connector body 141, and a moveable member preferably in form of insert 145 inserted into the connector body 141, and elastic means 148 elastically supporting the insert 145.

The connector body 141 has a substantially cylindrical shape having an open end and a closed end at a side opposing the open end. The connector body 141 includes a first portion 141a and a second portion 141b whose inner diameter is smaller than the first portion 141a. A female screw 142 (or other known connection structure such as a bayonet connector) is formed on the second portion 141b of the connector body 141 to engage with a bolt 161 (or other corresponding connection structure) of a stand (e.g., tripod 160), and a protrusion 143 is formed on an inner cavity of the connector body 141 such that the elastic means 148 is positioned on the protrusion 143. The insert 145 is inserted within the connector body 141 with the elastic means 148 engaged there-between for elastically supporting or biasing the insert 145 by the elastic means 148.

A stopper element, preferably in the form of flange 147, is formed at one end of the insert 145. The flange 147 can be stopped by a stepped portion 144 formed at a border between the first portion 141a and the second portion 141b of the connector body 141 such that the insert 145 pushed by the elastic means 148 is thereby positioned at a predetermined location in the hollow cavity of the connector body 141 while substantially closing the screw hole of the connector body 141.

Figure 5:
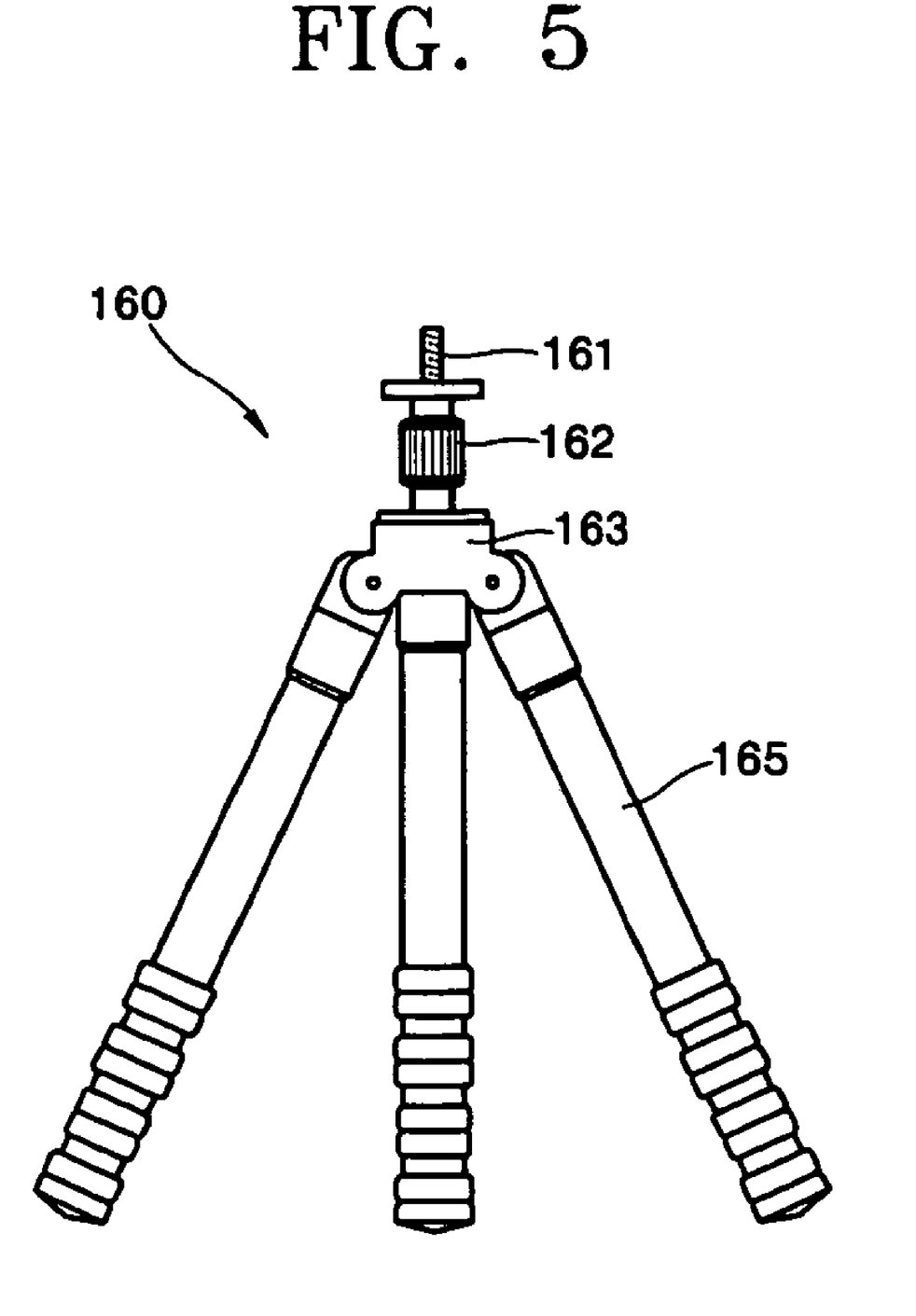
FIG. 5 is a schematic front view of a tripod for coupling to the imaging device having such a stand connector as shown in FIG. 2.
Figure 6:
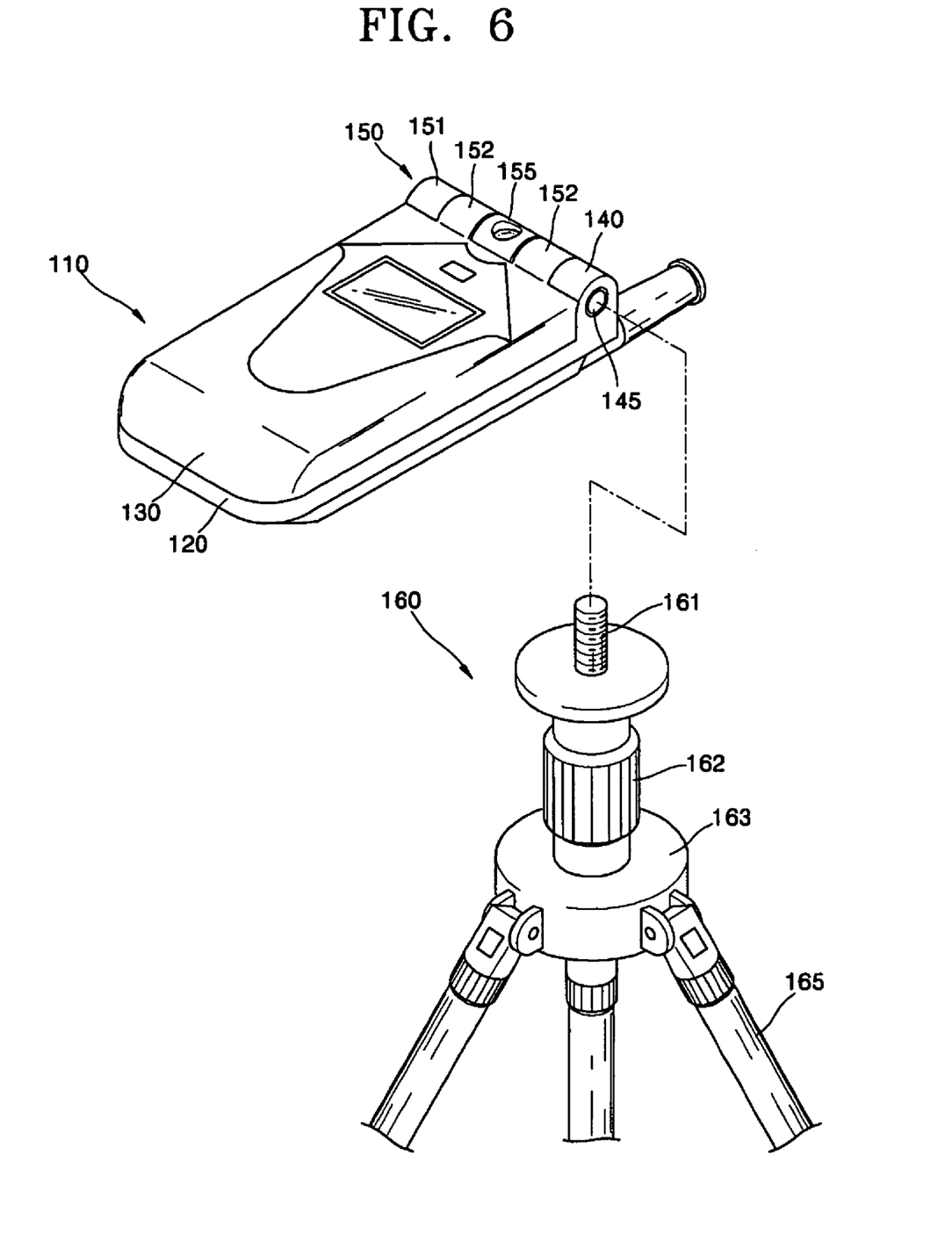
FIG. 6 is a perspective view illustrating a state for coupling the mobile phone of FIG. 2 to the tripod of FIG. 5.

The stand (e.g., tripod 160) for securing the mobile phone 110 thereto and positioning the device on the ground is coupled to the stand connector 140. FIG. 5 is a schematic view illustrating one example of the stand or tripod 160. As shown in FIG. 5, the tripod 160 includes a body 163, and legs 165 connected to the body 163 in a manner to be spread out by a predetermined angle. Each of the legs 165 can be unfolded and folded until a desired length is reached. As is well known, each leg 165 may comprise a plurality of hollow tubes overlapped for telescopically adjusting the overall length of the leg. The connecting bolt 161 extends by a predetermined height from a top surface of the tripod 160. As shown in FIG. 6, the bolt 161 can be screwed into the stand connector 140 of the mobile phone 110, for example, by rotating a rotary lever 162 in the tripod 160 for coupling the mobile phone 110 to the tripod 160.

Figure 7A:
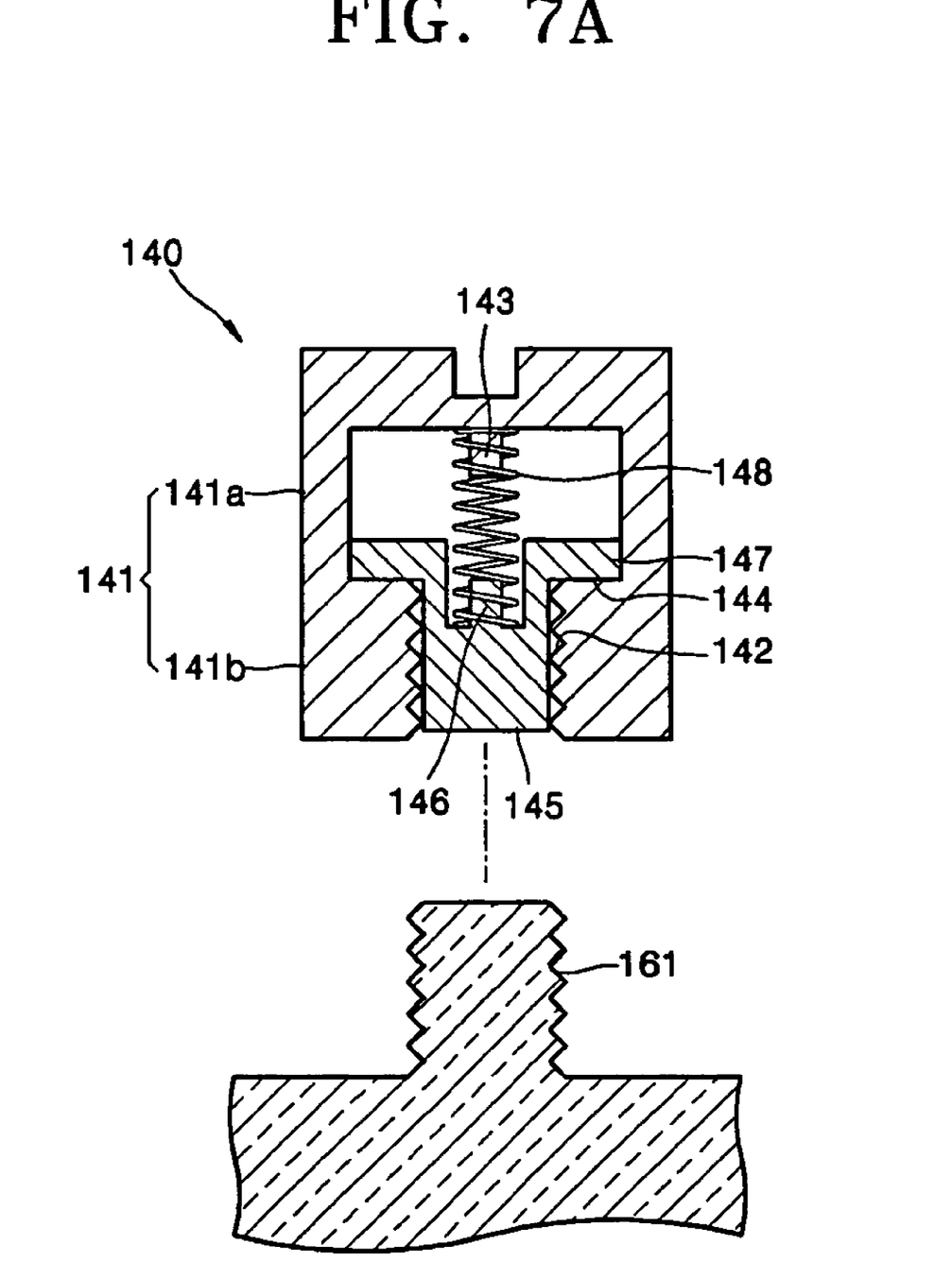
FIGS. 7A and 7B are sectional views illustrating a process of coupling a bolt of the tripod to the stand connector.
Figure 7B:
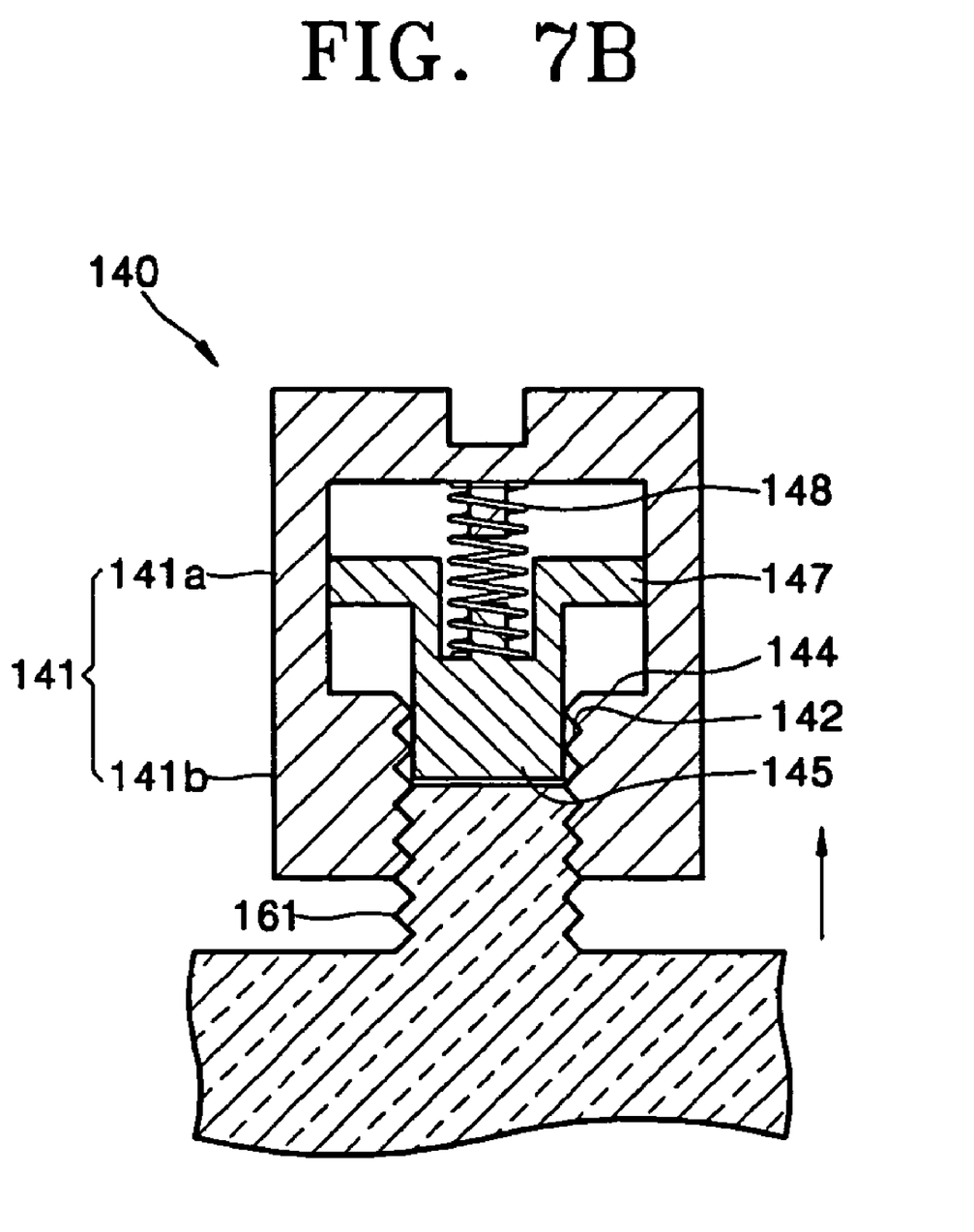

The coupling between the tripod 160 and the stand connector 140 is further described herein with reference to FIGS. 7A and 7B. As shown in FIG. 7A, the stand connector 140 remains normally in a closed position with the insert 145 pressed by the elastic means 148 and stopped by the stepped portion 144. As shown in FIG. 7B, when the bolt 161 of the tripod 160 is inserted into the screw hole of the connector body 141, the elastic means 148 contracts and the insert 145 is pushed into the connector body 141, and the bolt 161 of the tripod 160 engages with the female screw 142 formed on the connector body 141.

Figure 8:
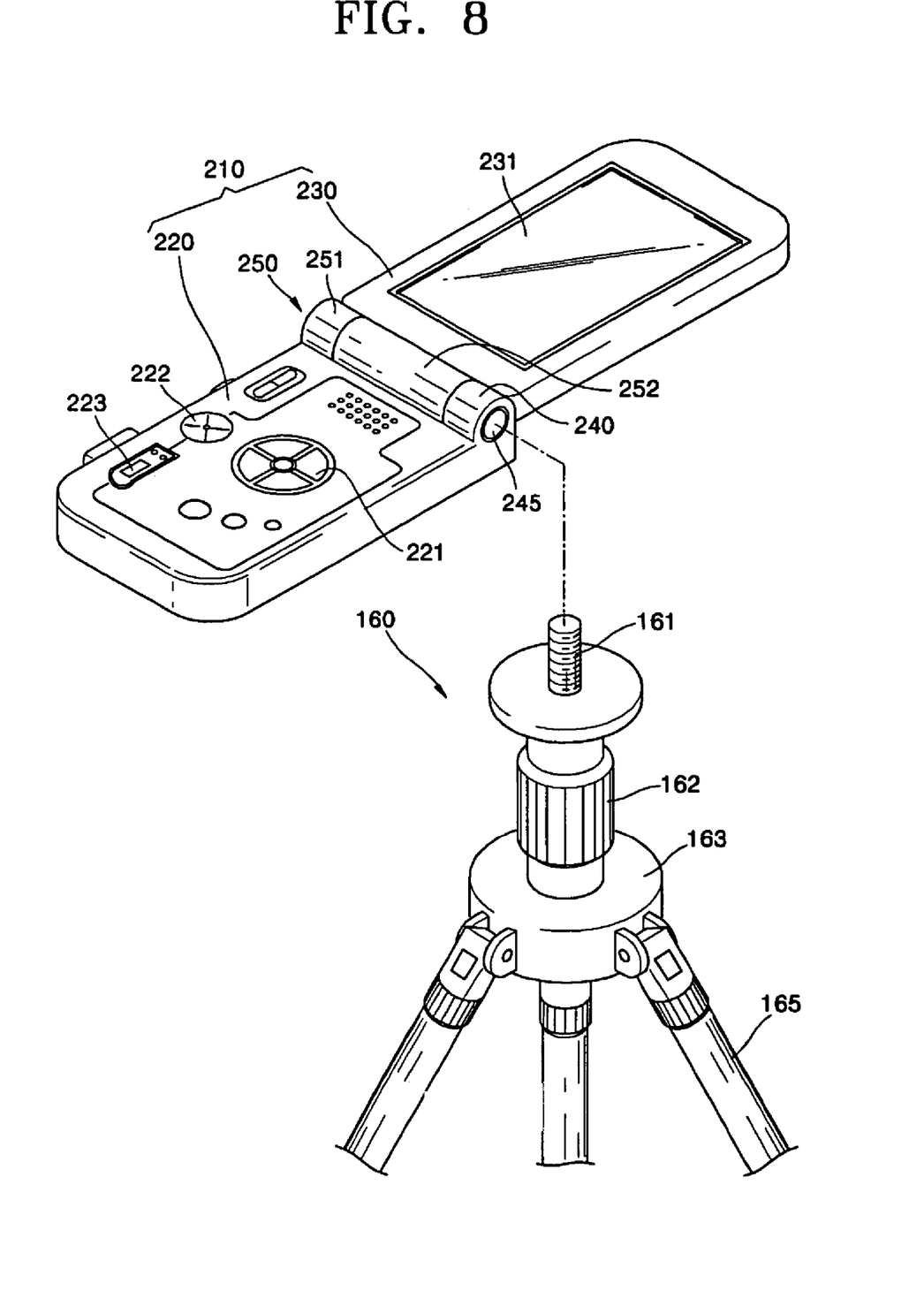
FIG. 8 is a perspective view of a digital camera constructed according to another embodiment of the present invention, illustrating a state for coupling the digital camera to the tripod.

FIG. 8 is a perspective view of a digital camera constructed according to another embodiment of the present invention. Referring to FIG. 8, a digital camera 210 includes a main body 220 having a camera lens (not shown) for taking images, and a panel 230 having a display panel 231 for displaying image information stored in the digital camera 210 and a menu screen for users. The main body 220 and the panel 230 are pivotably coupled by a hinge member 250, such that the main body 220 and the panel part 230 can rotate relative to each other to open and close the digital camera 210. Operation buttons 221 and a mode dial 222 for user entry of information, and a view finder 223 are disposed on the main body 220.

In the digital camera 210, the hinge member 250 includes a panel coupling part 252, and a body coupling part 251 and a stand connector 240 disposed on either side of the panel coupling part 252 and pivotably supporting the panel coupling part 252. The digital camera 210 can also be connected with the tripod 160 in a same or similar manner described above in connection with FIGS. 6–7B. In order to connect the digital camera 210 to the tripod 160, the bolt 161 in the tripod 160 is pushed against the insert 245 and rotated for engaging with a female screw (similar to that shown in FIGS. 7A–7B) formed in the stand connector 240. The insert 245 retracts in a recess of the stand connector 240 while elastically supported by an elastic member or spring disposed in the recess.

While the mobile phone and the digital camera are illustrated with the accompanied drawings as the imaging devices of the invention, the present invention is however not limited thereto. It can be applied to any other types of imaging devices that can be connected with a tripod or with any type of stand known in the art. For example, the stand connector of the invention may be formed on the bottom surface 10a of the camera illustrated in FIG. 1 for connection with such a stand.

While the present disclosure illustrates, as shown in FIGS. 6–7B, only one connection method between the imaging device and the stand (i.e., a screw connection by screws 142 and 161), the present invention is also not intended to limit to a particular type of connection method. For example, the tripod 160 and the connector body 141 may be connected by a bayonet connection (not shown) or other connection methods to be recognizable by one skilled in the art.

As described above, the imaging device of the present invention incorporates a stand connector that maintains its closed position by operation of the biased insert when it is not coupled with a stand. Accordingly, the imaging device can have a better appearance, and foreign substances are prevented from being introduced into the stand connector, thereby preventing poor coupling between the imaging device and the tripod.

Moreover, when the user connects the imaging device to a stand, the insert is pushed by the connecting element (e.g., bolt 161) of the stand and thus moves automatically to an open position. Thus, the imaging device can be easily connected with the stand without additional action. In addition, since the stand connector is coupled with the hinge member that connects the main body and the display panel, the present invention can be applied even to small or thin imaging devices such as the mobile phone and the like. The present invention can provide a secured connection of the imaging device with the stand, and a blurred image causable by taking a picture in an unstable state can be effectively prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An imaging device capable of coupling with a stand in order to take an object image with the imaging device coupled with the stand, said imaging device comprising:

a stand connector for coupling with the stand, the stand connector including a connector body having a hollow cavity and a connection element capable of coupling with a corresponding connection element of the stand, a movable member disposed adjacent to the cavity of the connector body and moveable between an open position allowing coupling of the stand with the connection element and a closed position covering an open end of the cavity in the connector body, and biasing means configured to bias the moveable member to the closed position.

2. The imaging device of claim 1, wherein the stand is a tripod.

3. The imaging device of claim 1, wherein the moveable member is an insert received in the cavity of the connector body and configured to stop at the closed position by the biasing force of the biasing means.

4. The imaging device of claim 3, wherein the insert has a stopper element opposing against a stepped portion of the connector body at the closed position.

5. The imaging device of claim 3, wherein the connection element of the stand connector is a female screw capable of coupling with corresponding male screw of the stand while the insert moves to the open position by pressing of the male screw of the stand.

6. The imaging device of claim 5, wherein the stand is a tripod.

7. The imaging device of claim 1, wherein the imaging device is a digital camera having a main body and a folder member pivotally coupled by a hinge member, and the stand connector is arranged at the hinge member of the digital camera.

8. The imaging device of claim 1, wherein the imaging device is a mobile phone capable of taking an image, the mobile phone having a main body and a folder member pivotally coupled by a hinge member, and the stand connector is arranged at the hinge member of the mobile phone.

9. The imaging device of claim 1, wherein the imaging device is a camera, and the stand connector is formed on a bottom surface of the camera.

10. A stand connector of an imaging device usable for coupling the imaging device with a stand, the stand connector comprising:

a connector body including a hollow cavity and a female screw capable of coupling with a corresponding male screw of the stand;

an insert received in the cavity of the connector body and moveable between an open position allowing coupling of the stand by screwing the screws of the connector body and the stand, and a closed position substantially covering an open end of the cavity in the connector body when not coupling with the stand; and biasing means configured to bias the insert to the closed position.

11. The stand connector of claim 10, wherein the stand capable of coupling with the connector body is a tripod.

* * * * *